Patented June 23, 1936

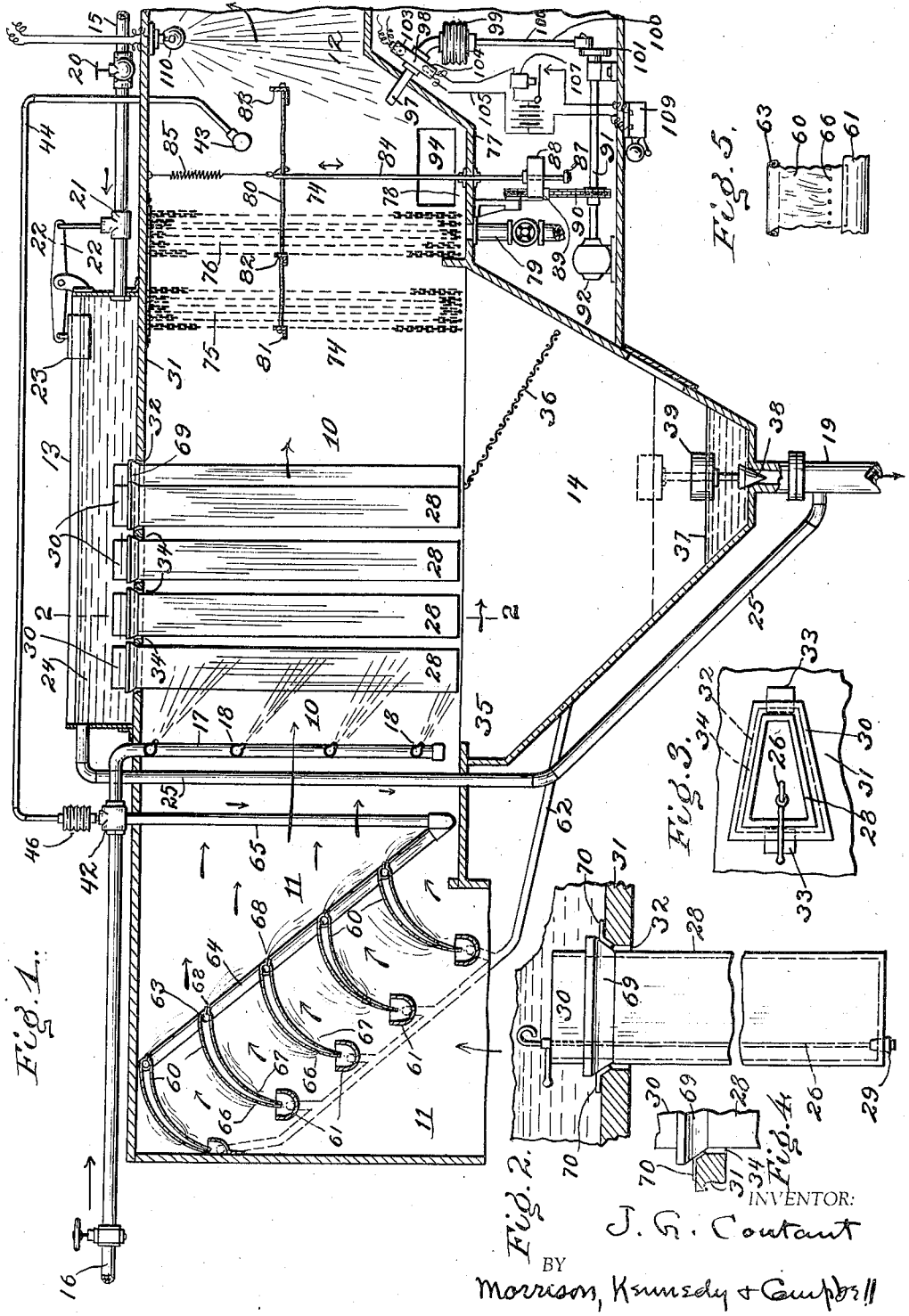

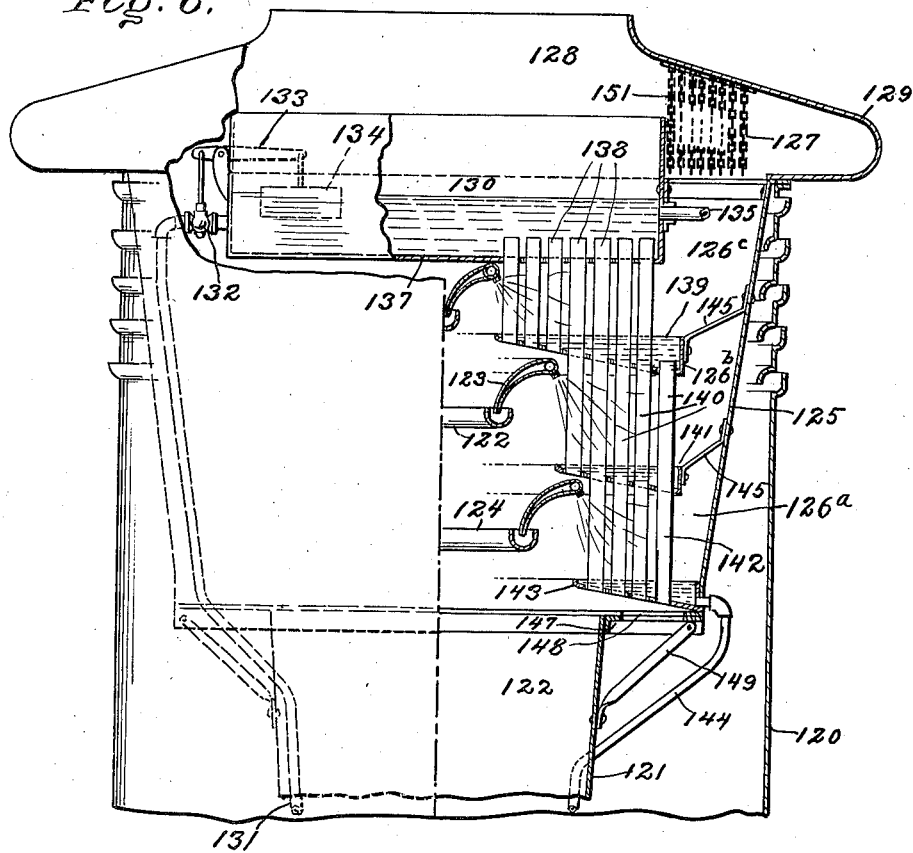
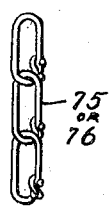
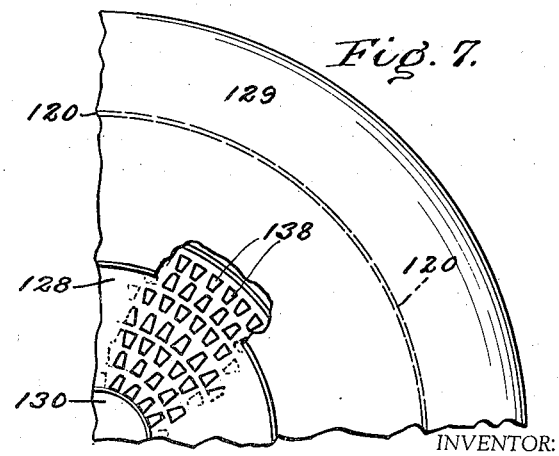

2,045,519

UNITED STATES PATENT OFFICE 2,045,519

PURIFICATION OF GASES

Jay Gould Coutant, New York, N. Y.

Application December 21, 1933, Serial No. 703,385

11 Claims. (Cl. 261—115)

This invention relates to the purification of gases, for example from furnaces or from other sources of combustion such as explosive or internal combustion engines; and the term gases is intended to include fumes, as the invention may be used for treatment of fumes from various sources, such as incinerators and destructor furnaces. The exhaust of Diesel or other engines may be treated and the apparatus may serve as a muffler both for quieting and treating explosion gases and may be employed in stationary plants, locomotives or steamships.

The general purpose of the invention is the removal of solid, volatile, acid or various other components of the gases which it is desirable should be removed for rendering the gases harmless and unobjectionable, or for the recovery of such components as by-products.

It is an object of the present invention to afford a gas purifying apparatus which will be simple and efficient in operation, strong, durable and yet inexpensive in construction, and compact. To some extent the present invention is an embodiment of and an improvement upon the apparatus shown in my Patent 1,866,193 issued July 5, 1932; but the features of improvement herein disclosed may be employed in other types of purification apparatus.

Other and more particular objects and advantages of the present improvement will be pointed out in the hereinafter following description of specific embodiments thereof or will be manifest to those conversant with the subject. To the attainment of such objects and advantages the present invention consists in the novel method of and apparatus for the purification of gases, and the novel features of operation, combination, arrangement and construction herein illustrated or described.

In the accompanying drawings Figure 1 may be considered a diagrammatic side elevation of an apparatus for purifying combustion or other gases in accordance with the present invention, with enclosing walls in section.

Fig. 2 is a fragmentary elevation of part of Fig. 1 on a larger scale.

Fig. 3 is a top plan view of the parts shown in Fig. 2.

Fig. 4 is an elevation view of a part of Fig. 2 showing a change of adjustment.

Fig. 5 is a fragmentary end elevation of certain parts shown in Fig. 1.

Fig. 6 is a diagrammatic elevation view corresponding substantially with Fig. 1 but showing a modification of the invention applied to the stack of a steamship.

Fig. 7 is a partial top plan view of Fig. 6 partly broken away.

Fig. 8 is an elevation view of a detail form of agitating element or chain which may be employed in any embodiment of the invention.

Referring to Figure 1, and following to some extent the system of reference numbers used in said patent, the central part of the apparatus may be defined as a first or main chamber 10, wherein certain of the purification steps occur. Leftward of the main chamber 10 is an inlet flue 11 bringing the gases upwardly and horizontally into the chamber. At the far right, beyond another chamber yet to be described, is an outgoing flue 12 which may be considered as delivering to a stack. The purification chambers may be considered as inserted in, as a part of, a flue 11—12, leading from a furnace or other source to a stack or other exit; although the apparatus hereof may be otherwise located and employed.

Above the main chamber is shown a reservoir 13, for example for holding a body of water or other equivalent liquid to be circulated in the chamber for purifying and neutralizing purposes. Below the main chamber is a collecting vessel 14. A water pipe 15 supplies water to the tank 13 from the right. At the left is a valved water supply pipe 16 conducting water to downtakes 17 connected to horizontal nozzle pipes 18 delivering into the main chamber space numerous water jets for treatment of the advancing gases. The bottom of the main chamber, may be open, as at 35, delivering the water and any impurities downwardly into the vessel 14, from which they may be drawn by a waste pipe 19.

The supply pipe 15 is shown controlled by hand valve 20, also by float valve 21 controlled by lever 22 and float 23, so as to shut off the supply when the water 24 fills the reservoir 13. An overflow pipe 25 from the reservoir delivers into the waste pipe 19.

Mounted uprightly in the main chamber is a system of a great number of tubular elements 28 which may be arranged in staggered rows and columns as shown in said patent. Each element 28 may have a drain plug 29 at its bottom end, operated by a rod 26 extending to the top. The wall 31 constituting the reservoir bottom and the top of the chamber is formed with apertures 32 to receive the elements 28, the latter however fitting loosely the apertures, leaving discharge openings or cracks 34 by which water may continuously descend from the reservoir over the outer surfaces of all of the hollow elements. The water from this source and from the jets or sprays 18 all passes down into the vessel 14. The top of this vessel at the right is shown as substantially blocked against substantial gas flow by a perforated screen 36 which retards the gases but permits any liquids thereabove to pass down to the collecting point. The liquid 37 in the vessel 14 may be periodically or automatically partially drained, along with any settled solid matter or sludge, namely by a float valve 38 controlled by a float 39.

The supply of water to the jet pipes 18 is preferably controlled automatically by a valve 42 interposed in the pipe 16. For example a temperature operated device 43 is shown located in or near the outlet flue 12, so that excess temperature at this point will cause expansion of gases, this being communicated by pipe 44 to a bellows 46 which operates to open further the valve 42 and increase the cooling action, thus to modify and prevent excess outgoing temperatures.

One of the improvements of the present invention relates to the flue 11 and consists in interposing in the gas stream a series of hollow or water cooled baffles or vanes 60. In the case of a rising flue which turns horizontally into the chamber 10 the baffles or guides 60 take a curved shape as shown so as to maintain the arrangement of the gases in the stream and deliver them with substantial uniformity from the rising to the horizontal direction of flow, and the baffles having substantial thickness for throttling or wiredrawing effect. Beneath the lower end of each hollow vane or guide 60 is shown a narrow transverse trough or gutter 61 extending clear across the flue, to receive any drippings from the vane. The several gutters 61 may all deliver into an exterior drain pipe 62 which slants and thence delivers into the collecting vessel 14.

At the top end of each water cooled baffle 60 is shown a transverse horizontal pipe 63 supplying water into the vane. The several pipes 63 are supplied with water from an inclined water pipe 64 which in turn is supplied by a downtake 65 extending from the valve 42. Each vane or baffle 60 is preferably perforated with a series of small holes 66 and 67 shown in Figs. 1 and 5, to permit the outflow of water to keep wet the upper and lower surfaces of the vane, the upflowing stream of gases serving to distribute the issuing water over the vane. Each pipe 63 may have small nozzles 68 delivering advancingly water jets as indicated in Fig. 1, to cool and remove some of the solid entrained matter and heavy vapors.

By these improvements in the entering flue the gases with entrained components are supplied properly to the main chamber and at the same time the entrained solids are preliminarily cooled, and to a substantial extent solid and soluble matters are removed by contact with the wetted surfaces and sprays, while acids are neutralized.

Another feature of improvement refers to the arrangement of the tubular elements 28, which may be generally like said prior patent. Each of these elements, near its upper end, is formed with a tapered or other flange 69, by which the element may be suspended from the plate 31 while occupying an aperture 32 therein. The aperture may have its upper side beveled as best shown in Fig. 2, and the slight spacing requisite to admit a steady downflow of water to the surface of the element may be preserved by small inserts or clips 70, holding the flange 69 slightly elevated and thereby providing the downflow crack or discharge opening. Adjustment is available by the change of the clips 70 for thinner clips, as shown in Fig. 4.

Another improvement consists in providing in the apparatus, beyond the main chamber 10, a supplemental or after chamber 74 wherein are mounted a first bank 75 and a second bank 76 of receiving members, composed for example of chains, of small thin links offering large mass and contact surface for accumulation of heat from gases. These chains occupy the flue or chamber and are adapted to capture or receive vapor and solid matters remaining in the outgoing gases as fog traveling from the main chamber to the stack. As will be described these groups of members are to be agitated, including any mechanical motion such as warping vibration or shaking, to dislodge progressively the accumulating liquids and solids deposited on the members and cause them to drop. The neutralizing agents or acids, oils and solids from the bank 75 are received in the collecting vessel 14, while acids and solids from the bank 76 are received in a shallow basin 78 formed above the bottom wall 77 of the flue, from which these materials may be removed by an outlet pipe 79.

When the groups 75 and 76 of agitated members comprise depending chains as shown, constructed for example as in Fig. 8, the agitation may be by swinging and warping of the depending chains and consequent mechanical rubbings and impacts of one against another. For this operation there is shown an agitator 80 in the form of a horizontal cable or chain which extends from a cross bar 81 on the innermost row of the group 75 to a similar cross bar 82 on the innermost row of the group 76 and thence to a fixed cross bar 83, so that deflecting the cable or agitator will cause the desired swinging and dislodging movements. This operation may be effected by a downwardly extending rod 84 sliding through the wall 77 and for convenience suspended from above by a spring 85, in the normal position shown. At the foot of the rod 84 is shown a stop 87 and sliding on the rod above the stop is shown a weight 88 which can be lifted and dropped to cause violent descent of the rod and agitation of the depending chain groups. The actuation of these elements may be through a finger or lug 89 mounted on an endless chain 90 consisting for example of a sprocket chain turning on a fixed upper sprocket wheel and a lower sprocket wheel mounted on a shaft 91 driven by a motor 92. As the lug 89 rises at one side it lifts the weight, and as the lug passes over the top it disengages and drops the weight, again to pick it up and so intermittently lift and drop the weight as long as the motor runs.

The chains or members 75 and 76 are preferably of metal, such as stainless iron or iron coated with lead or aluminum or other white metal if certain acids are present. They serve as heat accumulators, absorbing heat from the gases, and operate in a dry condition, capturing flue dust and various solids and even heavy condensed liquids or their crystals, namely, by breaking up the fog and causing distillation of lighter liquids. The members might take the form of perforated plates, wires, mesh sheets or other form, and be agitated or vibrated by impacts, electromagnetically or otherwise, to dislodge the captured materials and shake them down into the receptacles below.

In the flue side wall, near the bottom wall 77 and rod 84, is shown a door 94 closing a doorway which may be open to give access for various purposes including removal of accumulated products in the basin above the bottom wall 77.

Beyond the several parts heretofore described, and adjacent to the outlet flue 12, is shown a means for indicating the presence in the outgoing gases of poisonous or other dense or opaque gases, vapors or clouds. This instrument comprises a respirator or breathing pipe 97 leading from an interior point to a detecting chamber 98, beyond which is an extension of the pipe leading to a bellows 99 or equivalent pneumatic device operated by a rod 100 and crank 101 so that the bellows will suck gas through pipe 97 and then discharge it. Ordinarily there will be no action; but if the heavy materials referred to should be sucked into the detecting chamber this will operate an alarm, for example as follows. Within the chamber is a constantly illuminated electric lamp 103 and at the opposite side of the chamber a photoelectric cell 104. The cell 104 may be in a circuit 105 energized by a battery 106 and in the same circuit may be the magnet of a relay 107 controlling the circuit 108 of an electric bell or indicator 109. By this arrangement the alarm is sounded, when, and only when, sufficiently opaque gases or vapors are drawn into the breathing tube.

At the end of the apparatus, before entering the stack, the outgoing gases are made to pass under the influence of a bacteria destroying instrument, so that any bacteria not destroyed or removed in earlier stages will be rendered harmless at this point. For this purpose there is shown a lamp 110 of one of the kinds adapted to destroy bacterial life, and which lamp may be described as a death ray lamp. From this point the gases, purified and rendered harmless, are passed on to the stack.

To indicate one manner in which certain of the principles hereof can be applied directly in stacks, for example near the top of steamship stacks, reference may be made to Figs. 6 and 7 wherein, within the outer shell 120 of the stack is an inner wall 121 enclosing a rising flue 122. This flue does not rise directly to the stack exit, and the rising gases are shown diverted from an upward to a substantially horizontal travel, in an outward direction, by a system of curved hollow baffles 123 dripping into gutters 124, which baffles and gutters may be substantially as shown and described in connection with Figs. 1 and 5. Three such curved baffles are shown at successive levels, so that the uprising gases are directed outwardly at three different levels, the lowest baffle being removed further outwardly from the stack axis than the others.

The sections of rising gases which are thus diverted outwardly are shown as advancing into a system of annular chambers 126a, 126b and 126c at successively higher locations within the wall 125 constituting an extension of the wall 121. These combined chambers correspond substantially with the main chamber 10 of Fig. 1. The gases rise through the successive chambers and pass thence into an after or supplemental chamber 127 and from there to the final stack outlet 128, the stack having a cap 129 surrounding the final outlet and enclosing the chamber 127.

Within the stack, and substantially blocking its central upper part, is a water reservoir 130 supplied by a water pipe 131 controlled by a valve 132 operated by a lever 133 and float 134 to maintain a normal level, for example as shown. An overflow pipe 135 may deliver to any convenient point, for example against the wall 125. The reservoir 130 corresponds substantially with the reservoir 13 in Fig. 1 and correspondingly has a perforated bottom plate 137, the perforations arranged in concentric circles as shown in Fig. 7, and being occupied by upright elements 138 which extend into the reservoir and below it, with surrounding cracks or openings for the descent of water to keep wet the exterior surfaces of the elements. The elements 138 extend downwardly through the chamber 126c and at the lower part of this chamber is an intermediate collecting vessel 139 receiving the liquids and solids delivered by the elements 138 and by the sprays from the baffles 123. The intermediate vessel 135 may have a perforated bottom wall through which extend similar upright elements 140, some of which may be continuations of the elements 138. At the foot of chamber 126b, through which the elements 140 extend, is another collecting vessel 141. This mode of construction is shown continued further by reason of elements 142 extending through the perforated bottom of vessel 141, and delivering finally into a final collecting reservoir 143, from which extends a waste pipe 144 serving as an outlet for the entire series of reservoirs and collecting vessels. The several collecting vessels, below the reservoir 130, are shown as annular, and of graduated sizes, and those above the bottom one are shown suspended by inclined rods 145 from the wall 125. The lowest vessel 143 is shown attached directly to the wall 125. An annular horizontal wall 147 is shown connecting the vertical walls 121 and 125 and such annular wall may be formed with a gas passage 148 by which air or gases may be drawn into the flue 122. Braces 149 are shown connecting walls 121 and 125.

In the after chamber 127, preceding the final stack outlet 128 is shown a group or bank of agitating members or chains 151 which may be similar to those described in connection with Fig. 1, but in an annular arrangement, in the path of the gases traveling inwardly from the upper main chamber 126c to the stack final outlet.

The operation has been largely indicated in the foregoing description. It is not intended that the furnace gases shall be completely cooled by the described treatments, although they will be partially cooled in the flue 11 and in the main chamber 10 and in the after chamber 74, passing to the stack at reduced temperature. At the bend of the flue 11 the gas stream is deflected by the cooled baffles and at the same time somewhat throttled and therefore accelerated for uniform horizontal distribution into the main chamber. The baffles, wetted by water or other liquid, afford a preliminary removal of a considerable portion of dirt and heavy solids in the gases.

In the main chamber 10 a wet washing operation takes place, for example, by the sprays and the wet surfaces described. Various solids are extracted and vapors condensed. The solids removed may comprise ashes, dust, sulfur and sulfur gases, metals and noxious or poisonous substances. These various matters are received in the vessel 14. In traversing the main chamber the gases pick up considerable moisture, producing a fog, and in the latter part of the space 10, beyond the members 28, there will be a partial precipitation of such fog into the vessel 14.

This action of precipitation commences during travel between the elements 28, or even while the gases are subject to the sprays 18, the gases being thus progressively cooled, so as to reach the dew point by or before the time they pass from the system of elements 28, thus initiating precipitation of water particles from the gases, which precipitation continues therebeyond and is received in the vessel 14. The gases with residue of the water vapor particles is then treated as next described.

In the dry chamber 14 are treated the partly cleaned gases and the fog from the wet chamber. The depending chains are representative of metallic members presenting large surface area interposed in the gas path and compelling the gas stream to be subdivided and travel through tortuous passages, affording extensive contact and frequent changes of direction. This permits the subtraction or capture of various solids by contact. The momentum of solid particles insures their impact against the hot dry surfaces of this chamber. The gases keep hot the chains. Particles of fog may contain nuclei of dust, and these are removed by the evaporation of the fog and the capture of the dry dust upon the surfaces. Various materials are removable in this chamber; not only flue dust and ash but particles of fuel and of metals, which thus may be recovered. Acids may be captured and recovered, and by introduction of proper agents also clean carbon dioxide may be recovered; and poisonous vapors may be eliminated. The mechanical action described dislodges the deposits or crust upon the members or chains, these being shed or cracked off by the shaking, warping or vibration and delivered in the first instance to the collecting vessel 14.

The second gang of chains 76 may be of different character from the first; and may consist for example of a selective white metal or other substance acting as a catalyzer, to complete the removal of certain constituents, such as sulfur gases, removed as sulfuric or sulfurous acid. Following this stage the residue gases usually advance in a colorless, dry and clear gaseous condition.

When the apparatus hereof is employed on a vehicle the movements thereof may serve to effect agitation of the deposit members or chains, dispensing with the mechanical shaking described.

Beyond the chamber 14 the outgoing gases are subject to a test by the detecting apparatus described, samples of the gases being inhaled and exhaled by the tube 97 and a warning given if smoke, soot, poison gases or the like should be present in excessive quantities.

Finally, before reaching the stack or final outlet, the now transparent gases are subject to death ray treatment for the destruction of bacteria. The previous treatment of the gases by the hot dry members 75 and 76, including the hot contact with the metallic surfaces, prepares the gases for more effective destruction of bacteria.

The bacteria destroying instrument or lamp may be one operating on the principles explained by Dr. Charles H. Mayo involving opposing death dealing waves. It is known that bacteria carry negative electrical charges, have wave lengths according to their activity and thus are attracted to water drops and solids which are positive. The water and solid particles together with many bacteria are removed in chambers 10 and 14 while escaping free bacteria may now be rendered harmless by death dealing waves in flue 12.

To improve the action of eliminating sulfur and its compounds limestone or other neutralizing agent may be introduced into the furnace or hot gases, or milk of lime or other agent into the water introduced in flue 11 or chamber 10. This affords combination and precipitation; and the uncombined part of the lime or other agent will be arrested and precipitated as described in chamber 14, being deposited and baked on the members 76 and shaken therefrom, collected in the basin 78 and removed by the door 94, for subsequent treatment to produce fertilizer or other by-product.

In referring to the second purifying or dry chamber as containing metal members, any high heat conductive material is intended, as silicon carbide, stone or similar mineral shaking on a moving screen or otherwise agitated. The wet and dry chambers cooperate with the subsequent testing and bactericide instruments to deliver a final gas of minimum objection. Novel methods are involved including the cooperative steps described. The wet washing of the gases in transit cools the entrained particles below the temperature of the gases themselves, and to the dew point of vapors, and causes precipitation. The dry treatment dissipates or vaporizes the fog in the gases and removes the solids. The agitation keeps active the metal members and precipitates and recovers the captured solids. The detecting devices keeps check on the operations. The death ray lamp radiates within the flue, penetrating the gases rendered clear in the dry chamber.

Having disclosed embodiments of the principles of the invention, it is not intended to limit the invention to disclosed matters of apparatus, method, operation, combination, arrangement and construction, except to the extent set forth in the appended claims.

What is claimed is:

1. The method of purifying combustion or other hot gases in transit in a flue, comprising wet washing the gases to extract entrained solids and vapors, and treating the resulting fog, comprising water vapor particles with solid nuclei, by cooling to the dew point for partial precipitation of such particles, and thereafter treating the gases containing residue of water vapor particles by subjection to hot metal surfaces to cause gasification of the vapor and deposit of the solid nuclei on the surfaces, while methodically dislodging from such surfaces the solids received thereon.

2. Gas purification apparatus comprising, in combination with the flue or passage conducting the stream of hot gases, a purifying chamber interposed in the flue, and a series of baffles or vanes in the flue ahead of said chamber, such baffles arranged to guide and distribute the gases into the chamber, and having means for maintaining wetted the baffle surfaces, the baffles being hollow, with liquid exits, and having means to supply liquid thereto, to flow through such exits and be spread over the baffles by the advancing gases.

3. Gas purification apparatus comprising, in combination with the flue or passage conducting the stream of hot gases, a purifying chamber interposed in the flue, and a series of baffles or vanes in the flue ahead of said chamber, such baffles arranged to guide and distribute the gases into the chamber, and having means for maintaining wetted the baffle surfaces, and gutters receiving the drip from the baffles and conducting the same to the exterior of the flue.

4. Gas purification apparatus comprising, in combination with the flue or passage conducting the stream of hot gases, a wet washing chamber interposed in the flue to remove entrained matters, as dust, and therebeyond a hot dry chamber containing a system of metal or high heat conductive members arranged to present extensive contact surface to the gases and the fogs received from the wet washing chamber, and compel them to travel tortuous paths, whereby such members, maintained hot by the gases, operate to capture by evaporation of fog encrusting matters contained therein and permit to pass hot gases, and means for dislodging encrusted solids from such hot metal members.

5. Gas purification apparatus comprising, in combination with the flue or passage conducting the stream of hot gases, a wet washing chamber interposed in the flue, with a collecting vessel therebelow, and therebeyond a dry chamber containing a system of metal or high heat conductive members arranged to present extensive contact surface to the gases and compel them to travel tortuous paths, whereby such members, maintained hot by the gases, operate to capture solid and liquid constituents and permit to pass hot gases; the system of metal members comprising a first group discharging to said vessel, and a second group, and a basin receiving from the second group.

6. The method of purifying combustion or other hot gases in transit in a flue, comprising wet washing the hot gases to extract entrained heavy vapors and solids as dust while leaving the gases in hot condition, and therebeyond passing the hot gases and the fog formed in the wet washing stage through a hot dry chamber and therein treating them by extensive contacts with hot metal surfaces and by changes of direction to capture by evaporation of fog encrusting matters from the advancing gases, and encrusting thereof on the hot metal surfaces, while agitating such hot metal surfaces to dislodge solid encrustations therefrom, and the fog or vapors in the gases being gasified in the hot chamber and discharged as gases.

7. Gas purification apparatus comprising, in combination with the flue or passage conducting the stream of hot gases, a purifying chamber interposed in the flue, and a series of baffles or vanes in the flue ahead of said chamber, such baffles arranged to guide and distribute the gases into the chamber, and having means for maintaining wetted the baffle surfaces, the baffles being hollow, with liquid exits, and having means to supply liquid thereto, to flow through such exits and be spread over the baffles by the advancing gases, and gutters receiving drip from the baffles and conducting the same to the exterior of the flue.

8. Gas purification apparatus comprising, in combination with the flue or passage conducting the stream of hot gases, a wet washing chamber interposed in the flue to remove entrained matters, as dust, and therebeyond a hot dry chamber containing a system of metal or high heat conductive members arranged to present extensive contact surface to the gases and the fogs received from the wet washing chamber, and compel them to travel tortuous paths, whereby such members, maintained hot by the gases, operate to capture by evaporation of fog encrusting matters contained therein and permit to pass hot gases; said hot metal members being adapted to be warped, shaken, vibrated or otherwise agitated to cause dislodging and precipitation of encrusted solids thereon into a receiving vessel, and such receiving vessel.

9. Gas purification apparatus comprising, in combination with the flue or passage conducting the stream of hot gases, a wet washing chamber interposed in the flue to remove entrained matters, as dust, and therebeyond a hot dry chamber containing a system of metal or high heat conductive members arranged to present extensive contact surface to the gases and the fogs received from the wet washing chamber, and compel them to travel tortuous paths, whereby such members, maintained hot by the gases, operate to capture by evaporation of fog encrusting matters contained therein and permit to pass hot gases; said hot metal members consisting of numerous chains suspended in a bank to occupy the chamber and constitute a heat accumulating metal mass, and being adapted to be shaken, vibrated or otherwise agitated to cause dislodging and precipitation of encrusted solids thereon into a receiving vessel.

10. Gas purification apparatus comprising, in combination with the flue or passage conducting the stream of hot gases, a wet washing chamber interposed in the flue to remove entrained matters, as dust, and therebeyond a hot dry chamber containing a system of metal or high heat conductive members arranged to present extensive contact surface to the gases and the fogs received from the wet washing chamber, and compel them to travel tortuous paths, whereby such members, maintained hot by the gases, operate to capture by evaporation of fog encrusting matters contained therein and permit to pass hot gases, and mechanically driven means for causing methodical agitation of the metal members.

11. Gas purification apparatus comprising, in combination with the flue or passage conducting the stream of hot gases, a purifying chamber interposed in the flue, a water reservoir atop the chamber and formed with a system of apertures through its bottom into the chamber, and a system of upright elements loosely fitting and extending through such apertures and depending in the chamber; each such element having an upwardly flaring flange above the chamber with its upper part wider than the reservoir bottom aperture, and its flaring sides in opposition to the aperture edge, and interchangeable inserts between such flaring element sides and aperture edge, and upon which inserts the flaring portion of such flange rests, thereby to determine by the thickness of the inserts the rate of water flow from the reservoir to the element; and the element by its flaring flange being definitely positioned within such bottom aperture.

JAY GOULD COUTANT.